US010173676B2

(12) United States Patent
Hanzawa et al.

(10) Patent No.: US 10,173,676 B2
(45) Date of Patent: Jan. 8, 2019

(54) TRAVEL ASSIST DEVICE AND METHOD OF CONTROLLING TRAVEL ASSIST DEVICE (71) Applicant: HONDA MOTOR CO., LTD., Minato-ku, Tokyo (JP)

(72) Inventors: Daisuke Hanzawa, Wako (JP); Shinnosuke Ishida, Wako (JP); Kentaro Yamada, Wako (JP); Hiroyasu Kubota, Wako (JP); Makoto Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 15/312,910

(22) PCT Filed: Apr. 9, 2015

(86) PCT No.: PCT/JP2015/061056
§ 371 (c)(1),
(2) Date: Nov. 21, 2016

(87) PCT Pub. No.: WO2015/178119
PCT Pub. Date: Nov. 26, 2015

(65) Prior Publication Data
US 2018/0015919 A1 Jan. 18, 2018

(30) Foreign Application Priority Data
May 23, 2014 (JP) .................. 2014-107346

(51) Int. Cl.
*B60W 30/12* (2006.01)
*B60W 50/14* (2012.01)
(Continued)

(52) U.S. Cl.
CPC .............. *B60W 30/12* (2013.01); *B60Q 9/00* (2013.01); *B60R 21/00* (2013.01); *B60T 7/12* (2013.01);
(Continued)

(58) Field of Classification Search
CPC ...... B60W 30/12; B60W 10/18; B60W 10/20; B60W 2050/146; B60W 2710/182;
(Continued)

(56) References Cited

U.S. PATENT DOCUMENTS 2,499,349 A * 3/1950 Ayres ........................ G01S 1/02
244/182
4,015,366 A * 4/1977 Hall, III ............... A01D 46/005
137/236.1
(Continued)

FOREIGN PATENT DOCUMENTS

JP 2000-062635 A 2/2000
JP 2001-344687 A 12/2001
(Continued)

*Primary Examiner* — Behrang Badii
*Assistant Examiner* — Daniel L Greene
(74) *Attorney, Agent, or Firm* — Carrier Blackman & Associates, P.C.; Joseph P. Carrier; Fulchand P. Shende (57) ABSTRACT Provided are a travel assist device capable of producing, in a preferred manner, warning vibrations notifying deviation of a vehicle with respect to a travel path, and a method of controlling the same. A travel assist device includes a travel assist control device that notifies a driver about an anti-deviation direction or a deviation direction by making a steering angular acceleration in the deviation direction and the steering angular acceleration in the anti-deviation direction different from each other when producing warning vibrations, wherein a time-derivative value of a steering angle of a steering wheel is defined as a steering angular velocity, and a time-derivative value of the steering angular velocity is defined as the steering angular acceleration.

10 Claims, 5 Drawing Sheets (51) Int. Cl.

| | |
|---|---|
| *B62D 5/04* | (2006.01) |
| *B62D 6/00* | (2006.01) |
| *B60T 8/17* | (2006.01) |
| *B60R 21/00* | (2006.01) |
| *G08G 1/16* | (2006.01) |
| *B60T 8/1755* | (2006.01) |
| *B60Q 9/00* | (2006.01) |
| *B60T 7/12* | (2006.01) |
| *B60W 10/18* | (2012.01) |
| *B60W 10/20* | (2006.01) |
| *B60W 50/16* | (2012.01) |
| *B62D 15/02* | (2006.01) |

(52) U.S. Cl.
CPC ............ *B60T 8/17* (2013.01); *B60T 8/17557* (2013.01); *B60W 10/18* (2013.01); *B60W 10/20* (2013.01); *B60W 50/14* (2013.01); *B60W 50/16* (2013.01); *B62D 5/04* (2013.01); *B62D 5/046* (2013.01); *B62D 6/00* (2013.01); *B62D 15/029* (2013.01); *G08G 1/16* (2013.01); *G08G 1/167* (2013.01); *B60T 2201/083* (2013.01); *B60W 2050/146* (2013.01); *B60W 2710/182* (2013.01); *B60W 2710/207* (2013.01)

(58) Field of Classification Search
CPC ... B60W 2710/207; B60W 50/16; B60Q 9/00; B60T 7/12; B62D 5/046; B62D 15/029; G08G 1/16
See application file for complete search history.

(56) References Cited

U.S. PATENT DOCUMENTS

| | | | |
|---|---|---|---|
| 4,702,843 A * | 10/1987 | Oswald | B60C 23/003 180/24.07 |
| 7,039,866 B1 * | 5/2006 | Rosenberg | B25J 9/1689 345/156 |
| 2003/0144801 A1 * | 7/2003 | Braeuchle | B60Q 1/0076 702/56 |
| 2005/0096829 A1 | 5/2005 | Sugano et al. | |
| 2005/0258977 A1 * | 11/2005 | Kiefer | G08G 1/16 340/903 |
| 2007/0043490 A1 | 2/2007 | Yokota et al. | |
| 2007/0109104 A1 * | 5/2007 | Altan | B60Q 9/008 340/407.1 |
| 2007/0299580 A1 * | 12/2007 | Lin | B60W 10/20 701/41 |
| 2011/0106381 A1 * | 5/2011 | Filev | B62D 6/007 701/40 |
| 2011/0187520 A1 * | 8/2011 | Filev | B60W 50/16 340/438 |
| 2013/0190988 A1 | 7/2013 | Limpibunterng et al. | |
| 2015/0066244 A1 * | 3/2015 | Minemura | B62D 15/0245 701/1 |

FOREIGN PATENT DOCUMENTS

| | | |
|---|---|---|
| JP | 2003-081115 A | 3/2003 |
| JP | 2005-132183 A | 5/2005 |
| JP | 2007-055276 A | 3/2007 |
| JP | 2011-070550 A | 4/2011 |
| JP | 2012-006506 A | 1/2012 |
| JP | 2012-165503 A | 8/2012 |
| JP | 2013-056636 A | 3/2013 |
| JP | 2013-189143 A | 9/2013 |
| JP | 2013-244767 A | 12/2013 |

* cited by examiner

TRAVEL ASSIST DEVICE AND METHOD OF CONTROLLING TRAVEL ASSIST DEVICE

TECHNICAL FIELD

The present invention relates to a travel assist device and a method of controlling the same, which generates a warning vibration in a steering member when the occurrence of a future or actual departure of a user's own vehicle with respect to a travel path is detected.

Background Art

In Japanese Laid-Open Patent Publication No. 2013-056636 (hereinafter referred to as "JP2013-056636A"), an object is stated of providing a lane departure prevention apparatus, which performs a valid departure prevention operation for a vehicle while carrying out a notification of the lane departure to the driver, and which is capable of more reliably preventing a departure of the vehicle from a driving lane (paragraph [0005], abstract).

For achieving this object, the lane departure prevention apparatus (1) of JP2013-056636A includes a lane departure detection means (26) for predicting or detecting the departure of a vehicle from a driving lane, a departure direction detection means (26) for detecting the departure direction with respect to the driving lane of the vehicle, and a vibrational torque imparting means (8) for imparting a vibrational torque in left and right directions to a steering member (2) of the vehicle (abstract, claim 1). The vibrational torque imparting means imparts the vibrational torque in left and right directions to the steering member, with the steering angle at that time being in a neutral position, when any departure of the vehicle from the driving lane is detected or predicted, and further imparts the vibrational torque such that the imparting time of the vibrational torque on a side opposite to the detected departure direction is longer than the imparting time of the vibrational torque on the side of the departure direction (abstract, claim 1).

More specifically, according to JP2013-056636A, pulse widths PL, PR (duty ratios) in the left direction and the right direction of vibrational torque signals that are output to an electric power steering system 6 are modified responsive to a departure prevention direction and an anti-departure direction, i.e., a direction opposite to the departure direction (see claims 2 through 5, FIG. 5(a), FIG. 7(a), and paragraph [0021]).

In Japanese Laid-Open Patent Publication No. 2003-081115 (hereinafter referred to as "JP2003-081115A"), it is disclosed that a steering wheel 113 is vibrated in order to notify the driver of a lane departure (paragraphs [0008], [0023]). In relation to such vibrations, according to JP2003-081115A, it is noted that the drive current value of an operation actuator 100 may be set to a sine wave (or repetitive waveforms of a triangular wave or a rectangular wave) so as to finely vibrate the steering wheel 113 (paragraph [0031]).

SUMMARY OF INVENTION

As described above, according to JP2013-056636A, in order to achieve both notification of a lane departure and the departure prevention operation, the time for which a vibrational torque in the anti-departure direction is imparted is longer than the time for which the vibration torque is imparted in the departure direction (abstract, claim 1). However, for example, from the standpoint of providing a notification of a lane departure (departure of the user's own vehicle with respect to a travel path), room remains for improvement.

For example, with the configuration of JP2013-056636A, the departure prevention operation is started simultaneously with generation of vibrations (notification of the departure). While this feature has the advantage of starting the departure prevention operation at an early stage, on the other hand, control thereof tends to be limited from the standpoint of respectively and independently controlling the generation of vibrations and the departure prevention operation. Further, in the case that the departure is notified merely by generation of vibrations, since the direction of travel changes without giving prior notice to the driver, there is a concern that the driver may be confused or puzzled by such vibrations. In addition, when the lane departure prevention apparatus initiates the departure prevention operation at an early stage, it cannot be denied that the driver may tend to over-rely on or have a false sense of confidence in the operation of the lane departure prevention apparatus.

According to JP2003-081115A, in spite of the fact that the lane departure can be notified to the driver, the departure direction cannot be conveyed instantly.

The present invention has been devised taking into consideration the aforementioned problems, and has the object of providing a travel assist device and a method of controlling the same, which enables a warning vibration to suitably be generated in order to provide notification of a departure of a user's own vehicle with respect to a travel path.

A travel assist device according to the present invention is characterized by including a travel path recognizing unit configured to recognize a travel path of a user's own vehicle, a departure judgment unit configured to determine an occurrence of a future or actual departure of the user's own vehicle with respect to the travel path, and a travel assist control device configured to perform travel assistance by generating a warning vibration in a steering member when the occurrence of the future or actual departure is determined, wherein, if a time derivative value of a steering angle of the steering member is defined as a steering angular velocity, and a time derivative value of the steering angular velocity is defined as a steering angular acceleration, when the warning vibration is generated, the travel assist control device notifies a driver concerning an anti-departure direction or a departure direction, by causing the steering angular acceleration in the departure direction and the steering angular acceleration in the anti-departure direction to differ from each other.

According to the present invention, when the warning vibration is generated, the driver is notified concerning the anti-departure direction or the departure direction, by causing the steering angular acceleration in the departure direction and the steering angular acceleration in the anti-departure direction to differ from each other. In accordance with this feature, it is possible to notify the driver concerning the anti-departure direction or the departure direction on the basis of the steering angular acceleration. Consequently, the driver can easily recognize the anti-departure direction or the departure direction.

Further, according to the present invention, since the steering angular acceleration is made to change in the departure direction and the anti-departure direction, it becomes possible not to change the steering angle of the steering member before and after the warning vibration is generated. Stated otherwise, application of the warning vibration can be carried out independently with respect to the departure prevention operation by the travel assist device. Therefore, the degree of freedom of settings in relation to generation of the warning vibration can be increased.

Furthermore, in the case that the steering angle of the steering member before and after generation of the warning vibration is not changed by the warning vibration, any change in the direction of travel of the user's own vehicle due to the warning vibration itself becomes small. Owing thereto, the warning vibration can appropriately be used in the case it is desired to prompt a steering operation in the anti-departure direction by the driver oneself, or in the case it is desired to notify the driver before the fact of an automatic steering operation prior to starting the automatic steering operation in the anti-departure direction by the travel assist device.

When the warning vibration is generated, the travel assist control device may set a target current with respect to a motor configured to cause a change in the steering angle of the steering member, in accordance with a continuous wave based on a rectangular wave, and may cause the steering angular acceleration in the anti-departure direction in one period of vibration to be greater than the steering angular acceleration in the departure direction. In accordance with this feature, movement of the steering member in the anti-departure direction is emphasized, whereas movement of the steering member in the departure direction is not emphasized, whereby it becomes possible for the driver to easily recognize the anti-departure direction or the departure direction.

When the warning vibration is generated, the travel assist control device may generate the warning vibration in which a waveform indicative of the steering angular velocity is a sawtooth wave. In accordance with this feature, the driver can more easily recognize the anti-departure direction or the departure direction.

When the warning vibration is generated, the travel assist control device may set a target steering angular velocity, which is a target value of the steering angular velocity, and may form the target steering angular velocity along a sawtooth shaped reference waveform, together with setting a limiting value, an absolute value of the limit value being smaller than that of a peak value of the reference waveform, and may set the target steering angular velocity so as not to exceed the limit value. In accordance with this feature, the steering angular velocity can be controlled with high responsiveness.

The travel assist control device may gradually decrease the absolute value of the limit value on the basis of a degree of the departure, or the departure direction or the anti-departure direction. In accordance with this feature, it is possible to notify the driver concerning the degree of departure, or the departure direction or the anti-departure direction.

After the warning vibration has been generated, the travel assist control device may apply to the steering member a torque that induces the user's own vehicle to return to the travel path. In accordance with this feature, at least after the warning vibration has been generated, the user's own vehicle can be induced to return to the travel path.

The travel assist control device may operate a braking device of the user's own vehicle, in the case it continues to be determined that the occurrence of a future or actual departure of the user's own vehicle exists after generation of the warning vibration. In accordance with this feature, after the warning vibration has been generated, by decelerating the user's own vehicle, the user's own vehicle is easily induced to return to the travel path.

According to the present invention, there is provided a method of controlling a travel assist device, the travel assist device having a travel path recognizing unit configured to recognize a travel path of a user's own vehicle, a departure judgment unit configured to determine an occurrence of a future or actual departure of the user's own vehicle with respect to the travel path, and a travel assist control device configured to perform travel assistance by generating a warning vibration in a steering member when the occurrence of the future or actual departure is determined, wherein a time derivative value of a steering angle of the steering member is defined as a steering angular velocity, and a time derivative value of the steering angular velocity is defined as a steering angular acceleration, the method including the step, performed by the travel assist control device, of: when the warning vibration is generated, notifying a driver concerning an anti-departure direction or a departure direction, by causing the steering angular acceleration in the departure direction and the steering angular acceleration in the anti-departure direction to differ from each other. In addition, when the warning vibration is generated, the method further includes the steps, performed by the travel assist control device, of setting a target current with respect to a motor configured to cause a change in the steering angle of the steering member, in accordance with a continuous wave based on a rectangular wave, causing the steering angular acceleration in the anti-departure direction to be greater than the steering angular acceleration in the departure direction, and generating the warning vibration in which a waveform indicative of the steering angular velocity is a sawtooth wave.

DESCRIPTION OF EMBODIMENTS

A. Embodiment

A1. Description of Overall Configuration

[A1-1. Overall Configuration]

Figure 1:
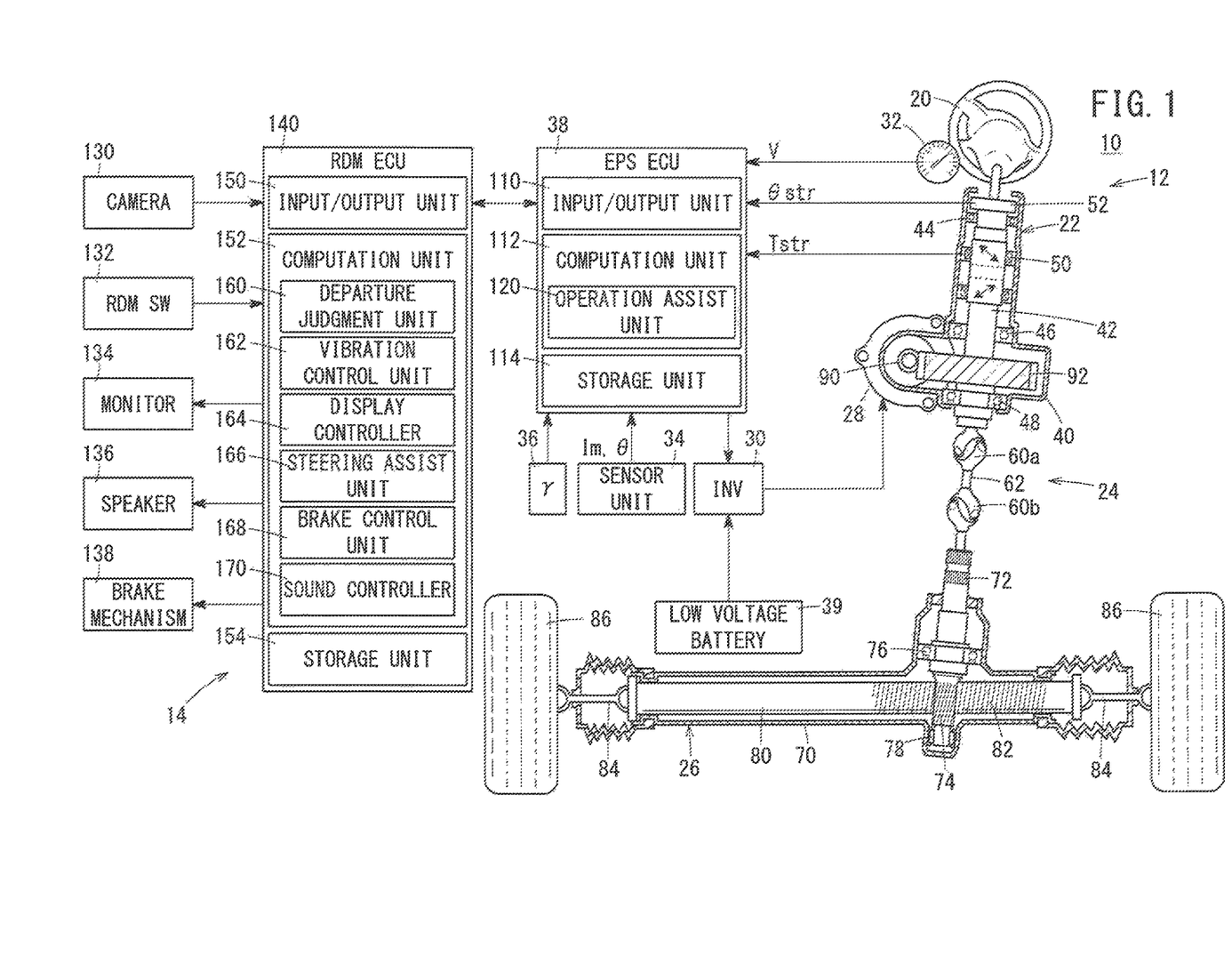
FIG. 1 is an outline schematic illustration of a vehicle including a road departure mitigation system as a travel assist device according to an embodiment of the present invention.

FIG. 1 is an outline schematic illustration of a vehicle 10 (hereinafter also referred to as a "user's own vehicle 10") including a road departure mitigation system 14 (hereinafter also referred to as an "RDM system 14") as a travel assist device according to an embodiment of the present invention (RDM: Road Departure Mitigation). As shown in FIG. 1, the vehicle 10, in addition to the RDM system 14, is further equipped with an electric power steering device 12 (hereinafter referred to as an "EPS device 12").

[A1-2. EPS Device 12]
(A1-2-1. Overall Structure of EPS Device 12)

The EPS device 12 includes a steering wheel 20 (steering member), a steering column 22, an intermediate joint 24, a steering gear box 26, a drive motor 28 (hereinafter also referred to as an "EPS motor 28") for driving the EPS device 12, an inverter 30 (hereinafter also referred to as an EPS inverter 30"), a vehicle velocity sensor 32, a motor sensor unit 34, a yaw rate sensor 36, an electric power steering electronic control device 38 (hereinafter referred to as an "EPS ECU 38" or an "ECU 38", and a low voltage battery 39 (hereinafter also referred to as a "battery 39").

The steering column 22 includes a casing 40, a steering shaft 42 supported by bearings 44, 46, 48 in the interior of the casing 40, a torque sensor 50, and a steering angle sensor 52. The intermediate joint 24 includes two universal joints 60a, 60b, and a shaft member 62 disposed therebetween. The steering gear box 26 includes a casing 70, a pinion shaft 72 supported by bearings 76, 78 and on which a pinion 74 of a rack and pinion mechanism is disposed, a rack shaft 80 on which rack teeth 82 of the rack and pinion mechanism are provided, and tie rods 84.

(A1-2-2. Manual Steering System)

One end of the steering shaft 42 is fixed to the steering wheel 20, and the other end thereof is connected to the universal joint 60a. The universal joint 60a is connected to one end of the steering shaft 42 and to one end of the shaft member 62. The universal joint 60b is connected to the other end of the shaft member 62 and to one end of the pinion shaft 72. The pinion 74 of the pinion shaft 72 engages with the rack teeth 82 of the rack shaft 80, which is capable of moving reciprocally in the vehicle transverse direction. Both ends of the rack shaft 80 are connected respectively to the left and right front wheels 86 (steered wheels) through the tie rods 84.

Consequently, a steering torque Tstr (rotational force) generated by operation of the steering wheel 20 by the driver is transmitted to the pinion shaft 72 through the steering shaft 42 and the intermediate joint 24. In addition, by the pinion 74 of the pinion shaft 72 and the rack teeth 82 of the rack shaft 80, the steering torque Tstr is converted into a thrust force, and the rack shaft 80 is displaced in the vehicle transverse direction. Accompanying the displacement of the rack shaft 80, the tie rods 84 steer the front wheels 86, whereby the orientation of the vehicle 10 can be changed.

The steering shaft 42, the intermediate joint 24, the pinion shaft 72, the rack shaft 80, and the tie rods 84 make up a manual steering system that directly transmits to the front wheels 86 a steering operation of the driver made with respect to the steering wheel 20.

(A1-2-3. Steering Assist System)
(A1-2-3-1. Assist Drive System)

The EPS motor 28 is connected to the steering shaft 42 through a worm gear 90 and a worm wheel gear 92. More specifically, an output shaft of the EPS motor 28 is connected to the worm gear 90. Further, the worm wheel gear 92 that meshes with the worm gear 90 is integrally or resiliently formed on the steering shaft 42 itself.

Although the EPS motor 28 in the present embodiment, for example, is a 3-phase AC brushless motor, it may be another type of motor, such as a 3-phase AC brush motor, a single-phase AC motor, a DC motor, or the like. Electrical power from the low voltage battery 39 is supplied to the EPS motor 28 through the EPS inverter 30, which is controlled by the EPS ECU 38. In addition, a drive force Fm (hereinafter also referred to as a "motor drive force Fm" or a "steering drive force Fm") is generated responsive to the electrical power. The motor drive force Fm is transmitted to the rack shaft 80 through the output shaft of the EPS motor 28, the worm gear 90, the steering shaft 42 (worm wheel gear 92), the intermediate joint 24, and the pinion shaft 72. The EPS motor 28, the worm gear 90, and the steering shaft 42 (worm wheel gear 92) constitute an assistive drive system that generates a drive force (steering drive force Fm) for steering.

The drive force Fm in the present embodiment is used as a steering assist force Fasi, together with being used as a drive force Frdm (hereinafter also referred to as an "RDM drive force Frdm") by a later-described road departure mitigation control. The steering assist force Fasi is a drive force for supplementing or assisting the steering of the driver in the same direction as the input torque (steering torque Tstr) of the driver with respect to the steering wheel 20. The steering assist force Fasi also is capable of working in an opposite direction to the steering torque Tstr. The RDM drive force Frdm is generated and acts independently of the steering torque Tstr, in order to mitigate a departure of the user's own vehicle 10 with respect to a travel path 200 (see FIG. 3). In the RDM drive force Frdm, there is included a drive force for generating a warning vibration to warn of departure of the user's own vehicle 10 with respect to the travel path 200.

(A1-2-3-2. Assist Control System)

The vehicle velocity sensor 32, the yaw rate sensor 36, the torque sensor 50, the steering angle sensor 52, the EPS inverter 30, the motor sensor unit 34, and the EPS ECU 38 constitute an assist control system for controlling an assistive drive system. Below, the assistive drive system, the assist control system, and the low voltage battery 39 will be referred to collectively as a steering assist system. In the present embodiment, the output of the EPS motor 28 is controlled by a so-called vector control using a d-axis and a q-axis.

(a) Feed-Forward System Sensor Types

The vehicle velocity sensor 32 detects the vehicle velocity V [km/h] of the vehicle 10, and outputs the vehicle velocity V to the EPS ECU 38. The yaw rate sensor 36 detects a yaw rate γ [rad/s] of the vehicle 10, and outputs the yaw rate γ to the EPS ECU 38. The torque sensor 50 comprises a magnetostrictive torque sensor which has high flexural stiffness and high torsional stiffness, and which includes magnetostrictive elements that are directly plated on the steering shaft 42. The torque sensor 50 outputs, to the EPS ECU 38, a voltage responsive to the torque (steering torque Tstr) that is input from the driver to the steering wheel 20. The steering angle sensor 52 detects a steering angle θstr [degrees] indicative of a steering amount of the steering wheel 20, and outputs the steering angle θstr to the EPS ECU 38. The vehicle velocity V, the yaw rate γ, the steering torque Tstr, and the steering angle θstr are used in a feed-forward control carried out in the EPS ECU 38.

(b) EPS Inverter 30

The EPS inverter 30 is constituted as a 3-phase full bridge inverter, which performs DC/AC conversion for converting a DC current from the low voltage battery 39 into a three-phase AC current, and supplies the AC current to the EPS motor 28.

(c) Feedback System Sensor Types

The motor sensor unit 34 detects a q-axis current (hereinafter referred to as a "motor current Im"), which is a torque current component in the aforementioned vector control. The motor current Im in the present embodiment is a positive value when the direction of rotation of the motor 28 is in a first direction (for example, a direction for turning the vehicle 10 toward the right), and is a negative value when the direction of rotation is in a second direction (for example, a direction for turning the vehicle 10 toward the left). However, insofar as the first direction and the second direction can be determined, a control may be performed with the motor current Im being only a positive value.

The motor sensor unit 34 includes a current sensor (not shown) that detects electric current of at least two phases from among a U-phase, a V-phase, and a W-phase in the windings (not shown) of the EPS motor 28, a resolver (not shown) that detects an electrical angle θ which is representative of the angle of rotation of a non-illustrated output shaft or an external rotor of the EPS motor 28, and a q-axis current calculating unit that calculates the motor current Im based on the electric current of at least two phases and the electrical angle θ. The function of the q-axis current calculating unit can be borne by the EPS ECU 38.

(d) EPS ECU 38

As shown in FIG. 1, the EPS ECU 38 is constituted as hardware, and includes an input/output unit 110, a computation unit 112, and a storage unit 114. The EPS ECU 38 controls the output of the EPS motor 28 through the EPS inverter 30 on the basis of the output values from the respective sensors.

In the present embodiment, the EPS ECU 38 controls the EPS inverter 30 in accordance with a pulse width modulation (PWM) method, however, it is possible for other methods (e.g., a pulse frequency modulation (PFM) method, or a combination of PWM and PFM methods) to be used. Further, in order to switch the direction of rotation of the motor 28 between normal rotation and reverse rotation, a non-illustrated switch may be provided, and the switch may be controlled by the EPS ECU 38.

The computation unit 112 includes an operation assist unit 120. The operation assist unit 120 implements an operation assist control for controlling the steering assist force Fasi for assisting the steering operations of the driver.

(A1-2-3-3. Low Voltage Battery 39)

The low voltage battery 39 is a power storage device which is capable of outputting a low voltage (in the present embodiment, 12 volts), and for example, can make use of a secondary battery such as a lead-acid storage battery or the like.

[A1-3. RDM System 14]

As shown in FIG. 1, the RDM system 14 includes a front camera 130 (hereinafter also referred to as a "camera 130"), an RDM switch 132, a monitor 134, a speaker 136, a brake mechanism 138, and a road departure mitigation electronic control unit 140 (hereinafter referred to as an RDM ECU 140).

The camera 130 is mounted on an inner side of a front windshield in front of the rear view mirror. In a state with the RDM switch 132 turned on, the camera 130 captures as an image white lines 202*l*, 202*r* (road boundary lines) on both sides of the forward travel path 200 (see FIG. 3).

The monitor 134 and the speaker 136 can utilize another vehicle-mounted device (for example, a non-illustrated navigation device). The brake mechanism 138 includes a non-illustrated hydraulic braking device, which reduces the vehicle velocity V by adding braking forces to the vehicle wheels 86.

The RDM ECU 140 is a device for carrying out a road departure mitigation control (hereinafter also referred to as an "RDM control"), which lessens or mitigates departure of the vehicle 10 from the travel path 200, and as hardware components thereof, includes an input/output unit 150, a computation unit 152, and a storage unit 154. The road departure mitigation control of the present embodiment is implemented inside of a range in which the vehicle velocity V, for example, is 60 to 100 [km/h]. The RDM ECU 140 detects the white lines 202*l*, 202*r* (see FIG. 3) on both sides of the vehicle 10 from an image (camera image) that is captured by the camera 130. Additionally, when the vehicle 10 determines that a departure of the vehicle 10 with respect to the travel path 200 actually exists or will exist in the future, the vehicle 10 controls the EPS motor 28 so as to mitigate the departure of the vehicle 10. In the example shown in FIGS. 3 and 4, a case is shown in which the vehicle 10 is exemplified as a left-side traveling vehicle.

The computation unit 152 includes a departure judgment unit 160, a vibration control unit 162, a display controller 164, a steering assist unit 166, a brake control unit 168, and a sound controller 170. The departure judgment unit 160 determines a future or actual departure of the vehicle 10 with respect to the travel path 200. The vibration control unit 162 controls generation of a warning vibration in the road departure mitigation control (RDM control). The display controller 164 controls a warning display implemented in the RDM control. The steering assist unit 166 carries out a steering assist in the RDM control. The brake control unit 168 controls a brake mechanism 138 in the RDM control. The sound controller 170 controls a warning sound implemented in the RDM control.

A2. Various Controls

[A2-1. Summary]

Next, descriptions will be given concerning controls in the EPS ECU 38 and the RDM ECU 140 of the present embodiment. The EPS ECU 38 implements a steering assist control. Further, the RDM ECU 140 implements a road departure mitigation control.

[A2-2. Steering Assist Control]

As noted above, the steering assist control serves to control the steering assist force Fasi for the purpose of assisting the steering of the driver. The steering assist force Fasi is indicated as a torque, and is in the same direction as the steering torque Tstr of the driver. Alternatively, the steering assist force Fasi may act in an opposite direction and as a reactive force to the steering torque Tstr of the driver.

The EPS ECU 38 calculates a target reference current Iref on the basis of the steering torque Tstr and the yaw rate γ, etc. The target reference current Iref is a reference value of the motor current Im for the purpose of assisting the steering of the driver. Basically, the absolute value of the target reference current Iref increases as the absolute value of the steering torque Tstr becomes greater. Further, when the target reference current Iref is calculated, a so-called inertia control, or a damper control, etc., may be used.

In the case that the road departure mitigation (RDM) control is not currently being implemented in the RDM ECU 140, the EPS ECU 38 sets the target reference current Iref without modification as the target motor current Imtar (Imtar←Iref). In the case that the RDM control is currently being implemented in the RDM ECU 140, the EPS ECU 38 sets the target motor current Imtar by adding to the target reference current Iref a corrective current Icor from the RDM ECU 140 (Imtar←Iref+Icor). In addition, the EPS ECU 38 changes the output of the EPS motor 28 by controlling the duty ratio of the inverter 30 such that the motor current Im matches with the target motor current Imtar.

Further, the corrective current Icor is an additive component for the RDM control. A configuration can also be adopted in which a portion of the calculation for the corrective current Icor is carried out by the EPS ECU 38.

[A2-3. Road Departure Mitigation (RDM) Control]

(A2-3-1. Overall Process Flow of RDM Control)

Figure 2:
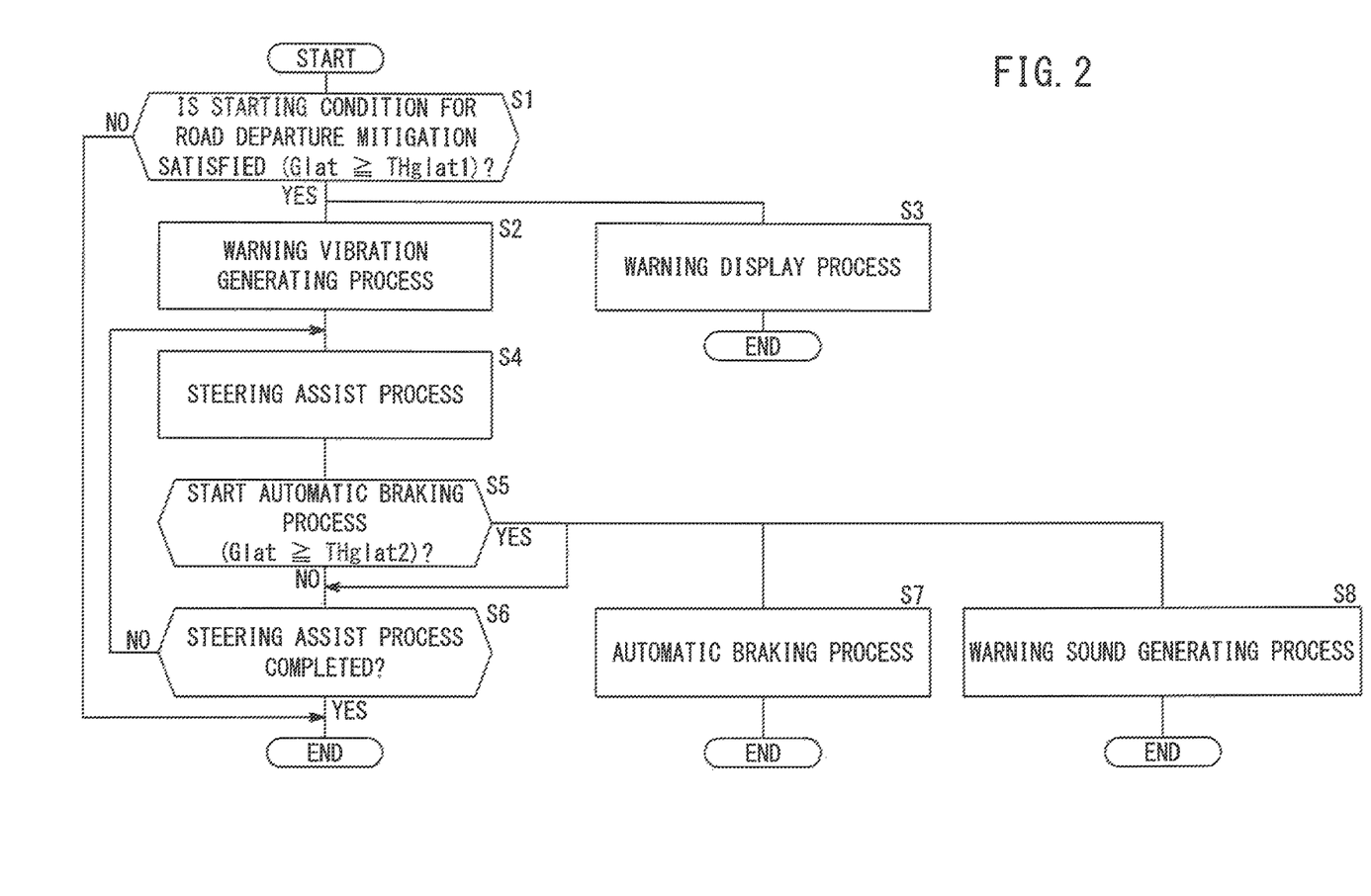
FIG. 2 is a flowchart of a road departure mitigation control in the present embodiment.
Figure 3:
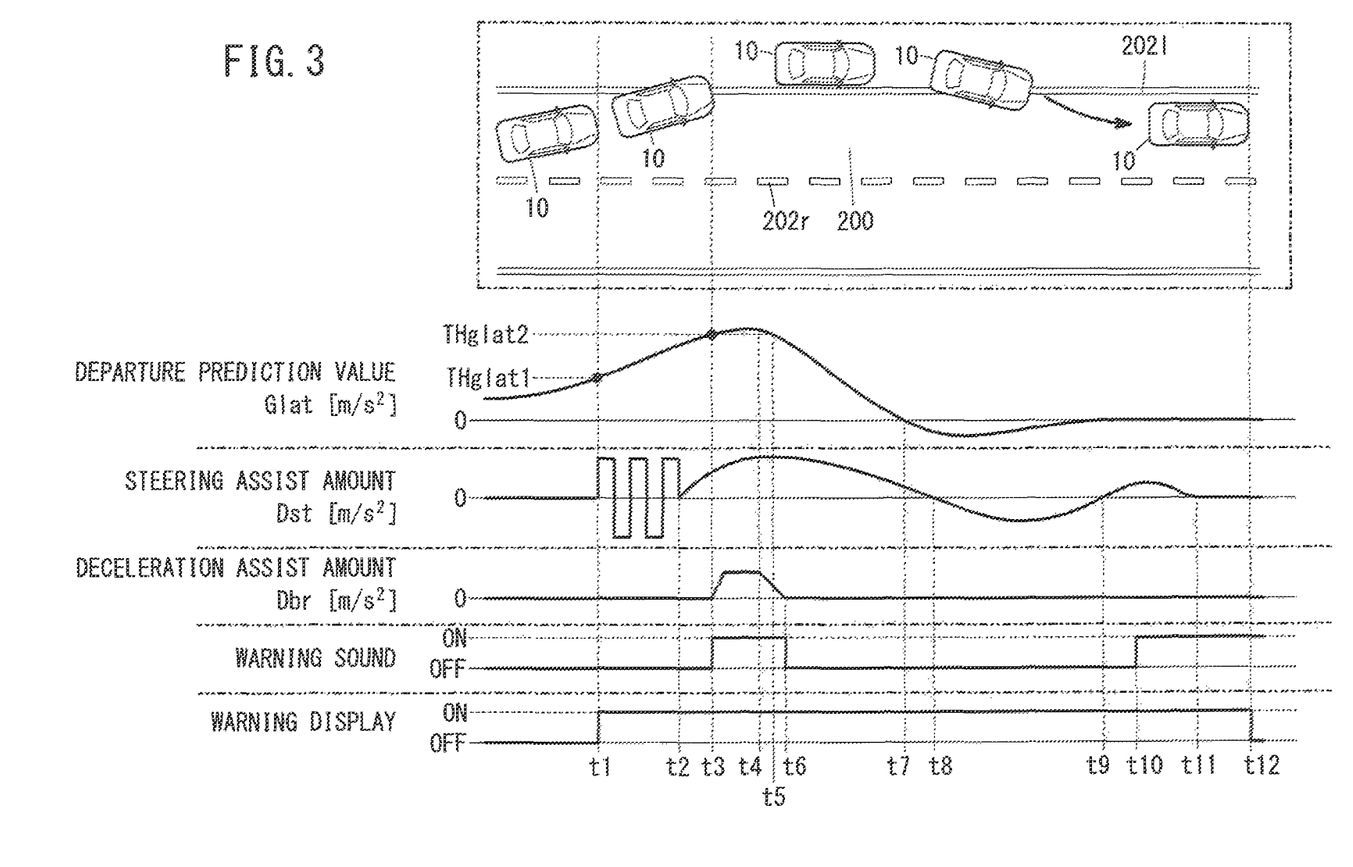
FIG. 3 is a time chart illustrating an example of a case in which the road departure mitigation control of the present embodiment is implemented.

FIG. 2 is a flowchart of the RDM control in the present embodiment. The flowchart of FIG. 2 is implemented in the case that the RDM switch 132 is turned on. FIG. 3 is a time chart illustrating an example of a case in which the RDM control of the present embodiment is implemented. As described above, the RDM control serves to mitigate a departure (a protrusion beyond or outside either one of the white lines 202l, 202r) of the vehicle 10 from the travel path 200. A steering assist amount Dst shown in FIG. 3 is a quantity $[m/s^2]$ to assist the steering of the driver as determined by the RDM control. A deceleration assist amount Dbr implies an amount of braking assistance $[m/s^2]$ performed by automatic braking in the RDM control.

In step S1, the RDM ECU 140 (departure judgment unit 160) determines whether or not a starting condition for road departure mitigation has been satisfied. As such a starting condition, there may be used the fact that a departure prediction value Glat has exceeded a threshold value THglat1 (hereinafter also referred to as a "departure mitigation judgment threshold value THglat1" or a "first threshold value THglat1") (see FIG. 3). Further details concerning the departure prediction value Glat will be discussed later with reference to FIG. 4. As starting conditions, there may also be used the same as those disclosed in JP2013-056636A. For example, there can be used that the vehicle velocity V lies within a predetermined value, that the driver does not have an intention of operating the vehicle, and that the distance up to either one of the white lines 202l, 202r is less than or equal to a predetermined value while the deviation angle is greater than or equal to a predetermined value (see FIG. 3 of JP2013-056636A).

If the starting conditions for road departure mitigation have not been satisfied (step S1: NO), then the current process is brought to an end, and after elapse of a predetermined time, the control is restarted from step S1. If the starting conditions for road departure mitigation have been satisfied (step S1: YES), then the control proceeds to step S2 and step S3.

In step S2, the ECU 140 (vibration control unit 162) executes a warning vibration generating process for generating a warning vibration in the steering wheel 20 (times t1 to t2 of FIG. 3). Further specific details of the warning vibration generating process will be described later with reference to FIG. 5.

Further, in parallel with step S2, in step S3, the ECU 140 (display controller 164) executes a warning display process to display a warning indication on the monitor 134 (times t1 to t12 of FIG. 3).

Subsequent to step S2, in step S4, the ECU 140 (steering assist unit 166) executes a steering assist process (times t2 to t11 of FIG. 3). During execution of the steering assist process, the ECU 140 (brake control unit 168) determines whether or not to start an automatic braking process. For example, the ECU 140 determines whether or not the departure prediction value Glat is greater than or equal to a threshold value THglat2 (hereinafter also referred to as a "deceleration assist determination threshold value THglat2" or a "second threshold value THglat2"). In addition thereto, in step S5, it may be confirmed using a flag or the like that the automatic braking process is not currently under operation.

In the case that the automatic braking process is not to be started (step S5: NO), then in step S6, the ECU 140 determines whether or not the steering assist process is completed. For example, it is determined whether or not the vehicle 10 has returned to the travel path 200, and is traveling along the travel path 200 in a state of being separated a predetermined distance from the white line 202l (i.e., between the white lines 202l, 202r). Alternatively, a maximum time threshold (for example a few to a dozen seconds) during which the steering assist process is continued is set in advance, and when the time from starting of the steering assist process has reached the maximum time threshold, it may be determined that the steering assist process is completed. If the steering assist process is completed (step S6: YES), then the current process is brought to an end, and after elapse of a predetermined time, the routine is restarted from step S1. If the steering assist process is not completed (step S6: NO), the routine returns to step S4, and the steering assist process continues.

In the steering assist process, during the time that the departure prediction value Glat is increasing, the steering assist amount Dst also increases (times t2 to t4 in FIG. 3). Further, when the departure prediction value Glat begins to decrease (time t4 in FIG. 3), the steering assist amount Dst decreases. In addition, in between the white lines 202l, 202r, until the vehicle 10 reaches a position, which is determined based on the white line 202l (a distance from the white line 202l), the orientation of the vehicle 10 is finely adjusted by controlling the steering assist amount Dst. More specifically, in the vehicle 10, after the departure prediction value Glat has become zero (time t7), and after the steering assist amount Dst has entered a negative value state (times t8 to t9) from zero (time t8), and finally undergoes a positive value state again (times t9 to t11), the steering assist process is brought to an end.

Returning to step S5 of FIG. 2, in the case that the automatic braking process is to be started (step S5: YES), then in step S7, the ECU 140 (brake control unit 168) executes the automatic braking process (times t3 to t6 of FIG. 3). Further, in parallel with step S7, in step S8, the ECU 140 (sound controller 170) carries out a warning sound generating process (times t3 to t6 of FIG. 3).

By the automatic braking process, a braking force is applied to the vehicle 10 by operating the brake mechanism 138. The deceleration assist amount Dbr of FIG. 3 is indicative of application of the braking force by the automatic braking process. Further, in the automatic braking process, during the time that the departure prediction value Glat is increasing (times t3 to t4), after the deceleration assist amount Dbr has increased from zero to a maximum value, the deceleration assist amount Dbr is kept at the maximum value. Further, during the time that the departure prediction value Glat is decreasing (times t4 to t6), the deceleration assist amount Dbr is made to decrease to zero from the maximum value.

In accordance with the warning sound generating process, a warning sound is output to the driver via the speaker 136. Generation of the warning sound by the warning sound generating process is performed during the time (times t3 to t6) that the automatic braking process is being carried out. However, generation of the warning sound need not necessarily coincide entirely with the execution time of the automatic braking process. Further, in the warning sound generating process, in the event that the operation amount (steering torque Tstr) of the steering wheel 20 by the driver is decreasing, the warning sound is output (time t10 to time t12).

(A2-3-2. Departure Prediction Value Glat (steps S1, S5 of FIG. 2))

Figure 4:
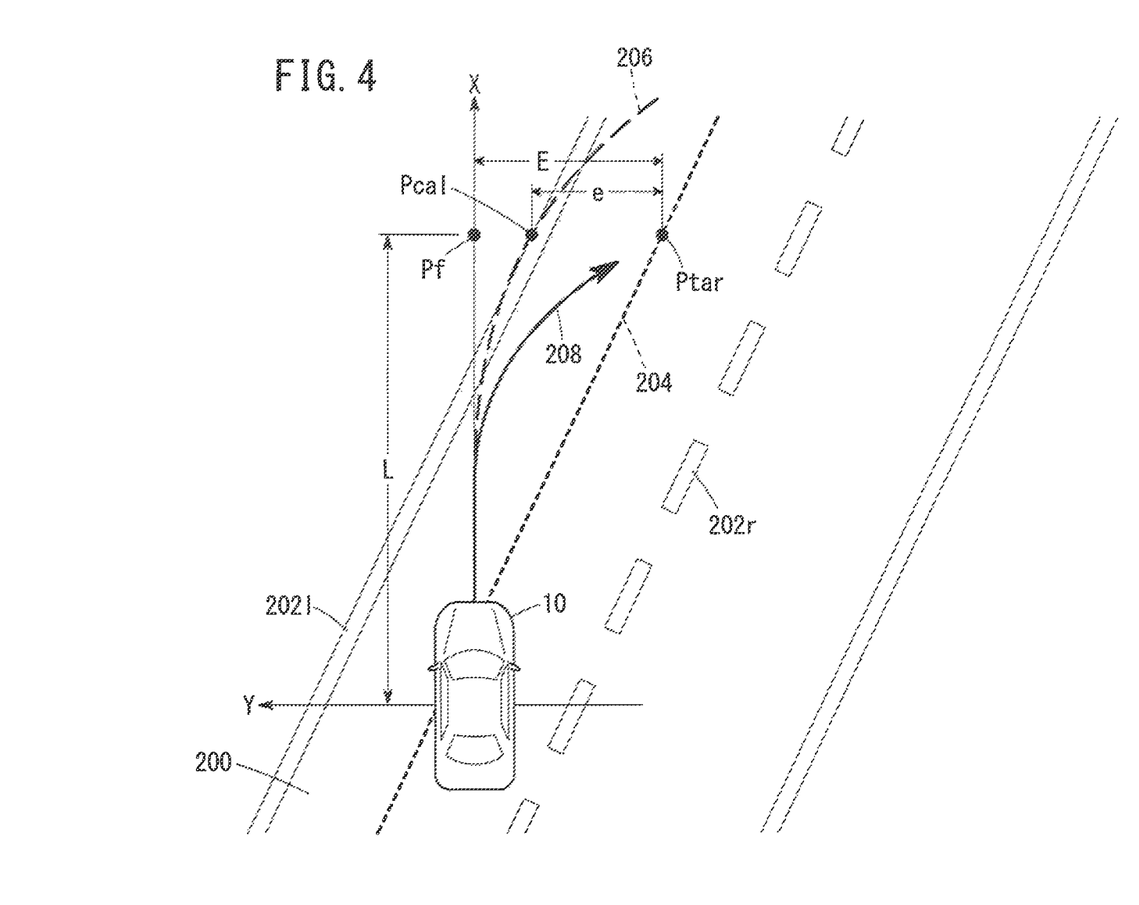
FIG. 4 is a view for describing various numerical values for the purpose of calculating a departure prediction value.

FIG. 4 is a view for describing various numerical values for the purpose of calculating the departure prediction value Glat. In FIG. 4, there are shown a travel path 200 for the user's own vehicle 10, which is delimited by the two white lines 202l, 202r (road boundary lines), a sequence of target travel points 204, a predicted travel trajectory 206 at the current point in time, and a target travel trajectory 208 in accordance with a steering assist. The sequence of target travel points 204 indicates an ideal trajectory (imaginary line) when traveling along the travel path 200. The predicted travel trajectory 206 is a trajectory (imaginary line) of the user's own vehicle 10 that is calculated from the yaw rate γ and the vehicle velocity V at the current point in time. The target travel trajectory 208 is a trajectory (imaginary line) of the user's own vehicle 10 for reaching an arrival target point Ptar on the sequence of target travel points 204, based on the yaw rate γ and the vehicle velocity V at the current point in time. In FIG. 4, the X-axis is taken along a vertical direction, and the Y-axis is taken along a horizontal direction.

The departure prediction value Glat [m/s$^2$] of the present embodiment is represented by the following formula (1).

$$Glat = \{(2EV/L^2) - \gamma\} \times V \qquad (1)$$

In formula (1), the respective variables are defined as follows:

E: the distance [m] between a forward point Pf of the user's own vehicle 10 and the arrival target point Ptar;

V: the vehicle velocity [m/s] of the user's own vehicle 10;

L: the distance [m] (hereinafter referred to as a front point distance L) from the user's own vehicle 10 to the forward point Pf; and γ: the yaw rate [rad/s] of the user's own vehicle 10.

Further, the forward point distance L is defined as a product of a reference time Tref [s] and the vehicle velocity V [m/s] (L=Tref×V). Stated otherwise, the forward point Pf is a position that occurs after the reference time Tref when the user's own vehicle 10 travels without change at the vehicle velocity V. The reference time Tref is a time for the purpose of setting a future point in time that serves as a reference when calculating the departure prediction value Glat. In the case that the vehicle 10 has traveled at the vehicle velocity V and the yaw rate γ at the current point in time, the arrival point of the vehicle 10 after elapse of the reference time Tref is the predicted arrival point Pcal. In FIG. 4, reference character "e" denotes a distance between the predicted arrival point Pcal and the arrival target point Ptar.

(A2-3-3. Warning Vibration Generating Process (step S2 of FIG. 2))

(A2-3-3-1. Summary of Warning Vibration Generating Process)

Figure 5:
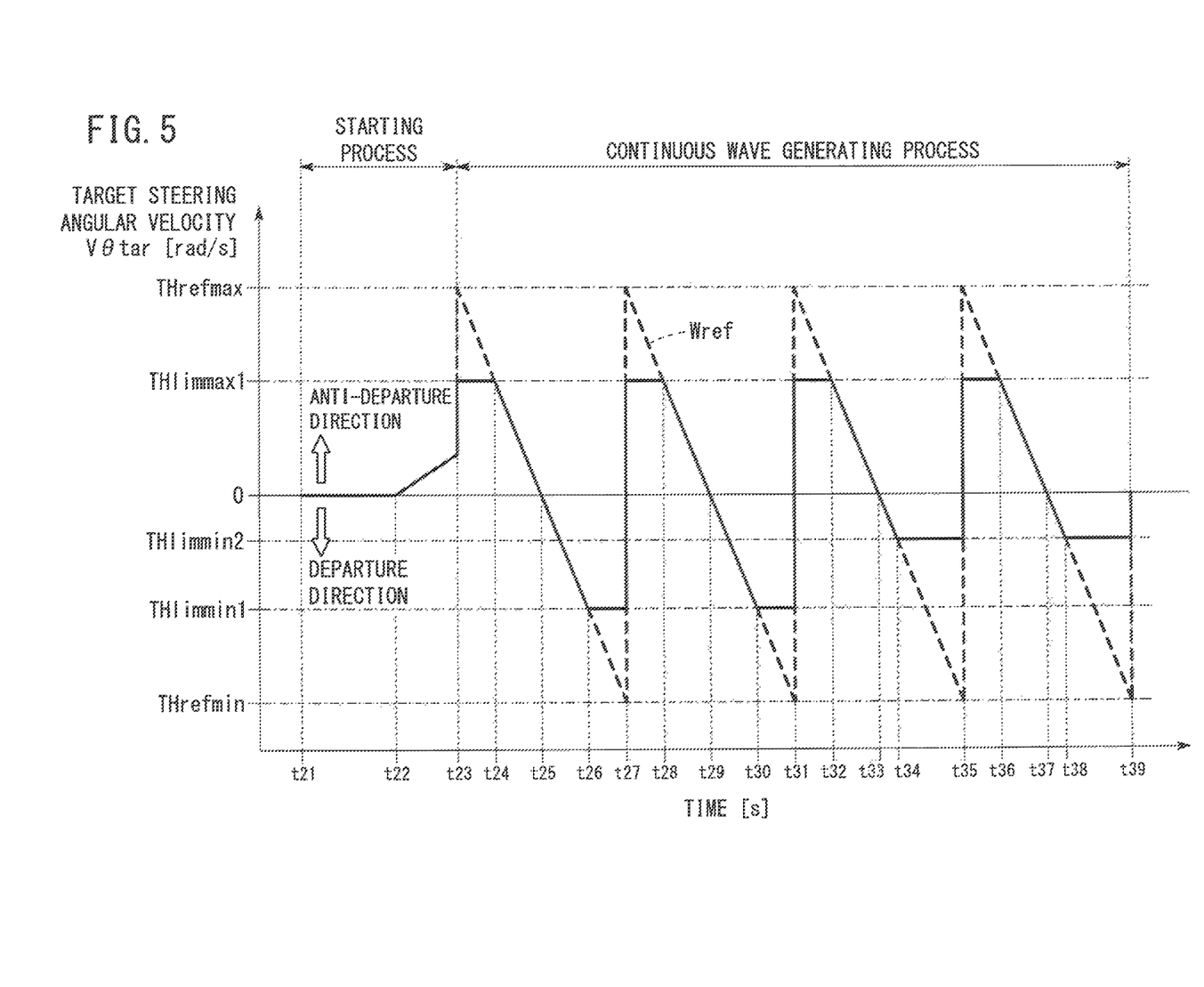
FIG. 5 is a view showing an example of a target steering angular velocity that is used in a warning vibration generating process.

FIG. 5 is a view showing an example of a target steering angular velocity Vθtar that is used in the warning vibration generating process. The horizontal axis of FIG. 5 represents time [s] and the vertical axis represents a target steering angular velocity Vθtar (hereinafter also referred to as a target velocity Vθtar) [rad/s]. The target velocity Vθtar is a target value for the angular velocity (hereinafter also referred to as a "steering angular velocity Vθ") of the steering angle θstr. As shown in FIG. 5, according to the warning vibration generating process, a starting process (time t21 to time t23) and a continuous wave generating process (time t23 to time t39) are carried out.

In the starting process, after an initial standby period (time t21 to time t22) has elapsed, the motor 28 is driven in an anti-departure direction (time t22 to time t23). The "anti-departure direction" referred to herein implies a direction that is opposite to the departure direction of the user's own vehicle 10 with respect to the travel path 200.

In the continuous wave generating process, the output of the motor 28 is controlled so as to realize the target velocity Vθtar which is a continuous waveform. According to the present embodiment, the target velocity Vθtar is set such that a continuous waveform is brought about on the basis of a sawtooth wave. Further, according to the present embodiment, when approaching toward a first restricted upper limit value THlimmax1 (or a reference waveform upper limit value THrefmax) of the target velocity Vθtar in the anti-departure direction (times t23, t27, t31, and t35), the absolute value of a target steering angular acceleration aθtar (hereinafter also referred to as a "target acceleration aθtar") [rad/s$^2$] is relatively large (in other words, the inclination thereof is steep). The target steering angular acceleration aθtar is a time derivative value of the target velocity Vθtar. Stated otherwise, the target steering angular acceleration aθtar is a target value of the steering angular acceleration aθ, which is a time derivative value of the steering angular velocity Vθ.

In contrast thereto, when approaching toward the first restricted lower limit value THlimmin1 (or a reference waveform lower limit value THrefmin) or a second restricted lower limit value THlimmin2 of the target velocity Vθtar in the departure direction (times t24 to t26, times t28 to t30, times t32 to t34, times t36 to t38), the absolute value of the target steering angular acceleration aθtar is relatively small (in other words, the inclination thereof is gradual).

In accordance with the above, when the steering angle θstr changes to the anti-departure direction, the steering wheel 20 rotates relatively strongly, and when the steering angle θstr changes to the departure direction, the steering wheel 20 rotates relatively gently. In accordance with this feature, it becomes easy for the driver to recognize the anti-departure direction or the departure direction.

In the foregoing manner, one vibration, for example, can have a length of from several tens to several hundreds of milliseconds. Further, in the foregoing manner, in order to make the target acceleration aθtar different, one vibration time period (for example, from time t23 to time t27) is controlled by being divided into a relatively large number of switching periods. More specifically, as noted previously, according to the present embodiment, the EPS inverter 30 (switching device) is controlled by way of PWM modulation. However, when the one vibration time period is adjusted to one switching period of the PWM modulation, it may be difficult to effect a change in the target acceleration aθtar. Thus, each of plural time periods (for example 10 to 20) into which the one vibration time period is divided is set to one switching period, whereby the change in the target acceleration aθtar can easily be realized.

At times t23, t27, etc., at which the absolute value of the target acceleration aθtar is increased, for example, the output of the motor 28 is made to change abruptly by setting the duty ratio in one or two switching periods to 100%. At times t27, t31, etc., due to the fact that the target velocity Vθtar changes from negative to positive, the direction of rotation of the motor 28 is reversed.

At times t24 to t26, etc., at which the absolute value of the target acceleration aθtar is decreased, the duty ratio in multiple switching periods is made to change gradually. More specifically, from time t24 to time t25, the target velocity Vθtar in the anti-departure direction is made to gradually decrease, and therefore, in the plural switching periods, the duty ratio at which the motor 28 is driven in a direction of rotation corresponding to the anti-departure direction is gradually decreased. Subsequently, from time t25 to time t26, the target velocity Vθtar in the departure direction is made to gradually increase, and therefore, in the plural switching periods, the duty ratio at which the motor 28 is driven in a direction of rotation corresponding to the departure direction is gradually increased.

The control of the steering angular velocity Vθ is basically performed as described above. However, for example, in the case that the absolute value of the steering angle θstr becomes too large, such that the steering angular velocity Vθ cannot follow the target steering angular velocity Vθtar, a feedback control can be carried out, for example, so as to reduce the target steering angular velocity Vθtar.

(A2-3-3-2. Setting of Target Steering Angular Velocity Vθtar in Continuous Wave Process)

Next, a description will be given concerning a setting method for the target steering angular velocity Vθtar in a continuous wave process. As shown in FIG. 5, when the target velocity Vθtar is set in the continuous wave process, at first, a reference waveform Wref is set. The reference waveform Wref is in the form of a sawtooth wave. The reference waveform Wref is a sawtooth waveform over a range defined by a reference waveform upper limit value THrefmax and a reference waveform lower limit value THrefmin. In this instance, as noted previously, in order to notify the driver concerning the anti-departure direction or the departure direction, when approaching toward the reference waveform upper limit value THrefmax, the inclination of the target velocity Vθtar is large, and when approaching toward the reference waveform lower limit value THrefmin, the inclination of the target velocity Vθtar is small.

Further, actually, a response delay arises when it is attempted to have the target velocity Vθtar reach the reference waveform upper limit value THrefmax and the reference waveform lower limit value THrefmin. Thus, according to the present embodiment, for the upper limit value that is used as the target velocity Vθtar, a first restricted upper limit value THlimmax1 (hereinafter also referred to as a "first upper limit value THlimmax1") is used. Further, for the lower limit value that is used as the target velocity Vθtar, a first restricted lower limit value THlimmin1 (hereinafter also referred to as a "first lower limit value THlimmin1") is used.

The first upper limit value THlimmax1 is utilized over the entirety of the continuous wave (over all four vibrations thereof), while on the other hand, the first lower limit value THlimmin1 is used in relation to a portion of (the first two vibrations of) the continuous wave. Thereafter, instead of the first lower limit value THlimmin1, a second restricted lower limit value THlimmin2 (hereinafter also referred to as a "second lower limit value THlimmin2") is used. The absolute value of the second lower limit value THlimmin2 is less than the absolute value of the first lower limit value THlimmin1. In accordance with this feature, it becomes easier for the driver to recognize the anti-departure direction or the departure direction.

A3. Advantages and Effects of the Present Embodiment

As described above, according to the present embodiment, when the warning vibration is generated, the driver is notified concerning the anti-departure direction or the departure direction, by causing the steering angular acceleration aθ of the steering wheel 20 in the anti-departure direction (time t23, etc., of FIG. 5) and the steering angular acceleration aθ in the departure direction (times t24 to t26) to differ from each other. In accordance with this feature, it is possible to notify the driver concerning the anti-departure direction or the departure direction on the basis of the steering angular acceleration aθ. Accordingly, the driver can easily recognize the anti-departure direction or the departure direction.

Further, according to the present embodiment, since the steering angular acceleration aθ is made to change in the departure direction and the anti-departure direction (see FIG. 5), it becomes possible not to change the steering angle θstr of the steering wheel 20 before and after the warning vibration is generated. Stated otherwise, application of the warning vibration can be carried out independently with respect to the departure prevention operation by the RDM system 14 (travel assist device). Therefore, the degree of freedom of settings in relation to generation of the warning vibration can be increased.

Furthermore, in the case that the steering angle θstr before and after generation of the warning vibration is not changed by the warning vibration, any change in the direction of travel of the user's own vehicle 10 due to the warning vibration itself becomes small. Owing thereto, the warning vibration can appropriately be used in the case it is desired to prompt a steering operation in the anti-departure direction by the driver himself, or in the case it is desired to give the driver a prior notice concerning an automatic steering operation prior to starting the automatic steering operation in the anti-departure direction by the RDM system 14.

In the present embodiment, when the warning vibration is generated, the RDM ECU 140 (travel assist control device) sets the target motor current Imtar with respect to the EPS motor 28 in accordance with a continuous wave based on a rectangular wave, and causes the steering angular acceleration aθ in the anti-departure direction in one period of vibration to be greater than the steering angular acceleration aθ in the departure direction (refer to FIG. 5).

In accordance with this feature, movement of the steering wheel 20 in the anti-departure direction is emphasized, whereas movement of the steering wheel 20 in the departure direction is not emphasized, and thus it becomes possible for the driver to easily recognize the anti-departure direction or the departure direction.

In the present embodiment, when the warning vibration is generated, the RDM ECU 140 (travel assist control device) generates the warning vibration such that a waveform indicative of the target velocity Vθtar (steering angular velocity Vθ) is in the form of a sawtooth wave (see FIG. 5). In accordance with this feature, the driver can easily be made to recognize the anti-departure direction or the departure direction.

In the present embodiment, when the warning vibration is generated, the RDM ECU 140 (travel assist control device) sets the target steering angular velocity Vθtar (see FIG. 5). The RDM ECU 140 forms the target steering angular velocity Vθtar along the sawtooth shaped reference waveform Wref, together with setting the first upper limit value THlimmax1 and the first lower limit value THlimmin1 (limiting values), the absolute values of which are smaller than those of the peak values of the reference waveform Wref, and sets the target steering angular velocity Vθtar so as not to exceed the first upper limit value THlimmax1 and the first lower limit value THlimmin1 (see FIG. 5). In accordance with this feature, the steering angular velocity Vθ can be controlled with high responsiveness.

In the present embodiment, the RDM ECU 140 (travel assist control device) gradually decreases the absolute value of the target steering angular velocity Vθtar on the departure side, by switching from the first lower limit value THlimmin1 to the second lower limit value THlimmin2, on the departure side (see FIG. 5). In accordance with this feature, the driver can more easily be made to recognize the anti-departure direction or the departure direction.

In the present embodiment, after the warning vibration has been generated (step S2 of FIG. 2), the RDM ECU 140 (travel assist device) applies to the steering wheel 20 a torque that induces the user's own vehicle 10 to return to the travel path 200 (step S4). In accordance with this feature, at least after the warning vibration has been generated, the user's own vehicle 10 can be induced to return to the travel path 200.

In the present embodiment, the RDM ECU 140 (travel assist control device) operates a brake mechanism 138 (braking device) of the user's own vehicle 10 (step S7 of FIG. 2, FIG. 3), in the case it continues to be determined that the occurrence of a future or actual departure of the user's own vehicle 10 exists (step S5 of FIG. 2: YES) after generation of the warning vibrations. In accordance with this feature, after the warning vibration has been generated, by decelerating the user's own vehicle 10, the user's own vehicle 10 is easily induced to return to the travel path 200.

B. Modifications

The present invention is not limited to the above-described embodiment, and based on the disclosed content of the present specification, it is a matter of course that various configurations may be adopted. For example, the following configurations can be adopted.

B1. Object in which Travel Assist Device is Installed

According to the above-described embodiment, the RDM system 14 (travel assist device) is mounted in the vehicle 10 (FIG. 1). However, for example, from the standpoint of notifying the driver concerning the anti-departure direction or the departure direction by way of the steering angular acceleration aθ, the invention is not limited to this feature. For example, the present invention may be applied to a mobile object or a movable apparatus equipped with an operating lever.

B2. EPS Device 12

[B2-1. Overall Structure of EPS Device 12]

The EPS device 12 according to the above embodiment comprises a structure in which the EPS motor 28 transmits the steering drive force Fm to the steering shaft 42 (a so-called column-assisted EPS device). However, the EPS device 12 is not limited to such a structure, insofar as the EPS device 12 is capable of generating the steering drive force Fm. For example, the EPS device 12 may be any one of a pinion-assisted EPS device, a dual-pinion-assisted EPS device, a rack-assisted EPS device, and an electro-hydraulic power steering device. In the electro-hydraulic power steering device, an electrically operated pump generates a hydraulic pressure for producing the steering drive force Fm.

In the above embodiment, the steering torque Tstr applied by the driver is directly transmitted to the front wheels 86 (hereinafter referred to as a "direct transmission type"). However, the present invention also may be applied to a steer-by-wire type of electric power steering device.

[B2-2. EPS Motor 28]

In the above embodiment, the EPS motor 28 comprises a three-phase AC brushless motor, however, the invention is not limited to this feature. For example, the motor 28 may be constituted by a three-phase AC brush motor, a single-phase AC motor, or a DC motor.

In the above embodiment, the motor 28 is supplied with electrical power from the low voltage battery 39 (see FIG. 1). However, in addition thereto or in place thereof, electrical power may be supplied to the motor 28 from an alternator, a fuel cell, or a high voltage battery.

[B2-3. Other Features]

In the above-described embodiment, although the inverter 30 and the battery 39 are directly connected (see FIG. 1), a voltage boosting converter (not shown) may be arranged between the inverter 30 and the battery 39. In this case, when the warning vibration is generated, at the time that the steering angular acceleration aθ changes to the anti-departure direction (times t23, t27, etc., of FIG. 5), the voltage boosting converter is operated, whereas at the time that the steering angular acceleration aθ changes to the departure direction (times t24 to t26, etc.), operation of the voltage boosting converter is stopped, and the voltage of the battery 39 can be applied as is to the inverter 30.

B3. RDM System 14 (Travel Assist Device)

In the aforementioned embodiment, as the travel assist device, the RDM system 14 (FIG. 1) is described, which carries out the road departure mitigation control (FIG. 2). However, for example, from the standpoint of notifying to the driver the anti-departure direction or the departure direction by means of the steering angular acceleration aθ, the invention is not limited to this feature.

For example, a lane maintaining device that controls the behavior of the user's own vehicle 10 so as to travel along the white lines 202*l*, 202*r* (the travel path 200) may also be utilized as the travel assist device. Alternatively, the present invention can be combined with a dozing detection device. More specifically, the warning vibration can be generated in the case that the dozing detection device has detected dozing (a state in which alertness falls below a certain threshold) of the driver. In this case, compared with the RDM system 14 of the above-described embodiment, the warning vibration can be generated even in the case that the distance from the user's own vehicle 10 to the white lines 202*l*, 202*r* is relatively long.

In the above embodiment, a description has been made bearing in mind that the RDM system 14 as a whole is mounted in the user's own vehicle 10. However, for example, portions (the RDM ECU 140, etc.) of the RDM system 14 may be provided in a portable terminal, and the RDM system 14 may be constituted by connecting the portable terminal to a network of the vehicle 10.

In the above embodiment, the EPS device 12 and the RDM system 14 have been described as separate constituent components. However, for example, from the standpoint of notifying to the driver the anti-departure direction or the departure direction by means of the steering angular acceleration aθ, the functions of the RDM system 14 may be included within the EPS device 12. Alternatively, the functions of the EPS device 12 can be included within the RDM system 14.

B4. Road Departure Mitigation Control (FIG. 2)

According to the above-described embodiment, a process flow takes place (FIG. 2) in which the steering assist process (step S4) is always performed immediately after the warning vibration generating process (step S2 of FIG. 2). However, from the standpoint of notifying the driver concerning the anti-departure direction or the departure direction on the basis of the steering angular acceleration aθ, the invention is not limited to this feature. For example, in addition to the judgment made for the purpose of carrying out the warning vibration generating process (the judgment in step S1 of Glat≥THglat1), there can be used a judgment (a judgment of Glat≥THglat3) for the purpose of carrying out the steering assist process. In this case, after the warning vibration generating process, if the departure prediction value Glat decreases before the departure prediction value Glat becomes greater than or equal to the threshold value THglat3, then the steering assist process is not carried out. The threshold value THglat3 can be a value that is greater than the threshold value THglat1 (step S1 of FIG. 2), and less than the threshold value THglat2 (step S5).

According to the above embodiment, although the steering angular acceleration aθ is changed in order to notify the driver concerning the anti-departure direction or the departure direction (FIG. 5), for example, from the standpoint of notifying to the driver the anti-departure direction or the departure direction, the invention is not limited to this feature. For example, instead of the target velocity Vθtar on the vertical axis of FIG. 5, it is possible to use a target steering angle θstrtar. More specifically, in the case that the target steering angle θstrtar (amplitude of the warning vibration) is directed toward the anti-departure direction, the steering angular velocity Vθ may be increased, and in the case it is directed toward the departure direction, the steering angular velocity Vθ may be decreased.

In the above-described embodiment, switching of the limiting value of the target steering angular velocity Vθtar from the first restricted lower limit value THlimmin1 to the second restricted lower limit value THlimmin2 is performed on the basis of the departure direction (refer to FIG. 5). However, for example, from the standpoint of switching the limiting values of the target steering angular velocity Vθtar, the invention is not limited to this feature. For example, switching or changing the limiting value of the target steering angular velocity Vθtar can be made to occur on the basis of a degree of departure (the value of the departure prediction value Glat) or the anti-departure direction.

In the above-described embodiment, the corrective current Icor for the road departure mitigation control (see FIG. 2) including the warning vibration generating process is calculated by the RDM ECU 140. However, for example, from the standpoint of generating the warning vibration, the invention is not limited to this feature. For example, whether or not there is a need for the warning vibration may be determined by the RDM ECU 140, and if it is judged that the warning vibration is necessary, a warning vibration generating command may be transmitted from the RDM ECU 140 to the EPS ECU 38.

The invention claimed is:

1. A travel assist device comprising:
 a travel path recognizing unit configured to recognize a travel path of a user's own vehicle;
 a departure judgment unit configured to determine an occurrence of a future or actual departure of the user's own vehicle with respect to the travel path; and
 a travel assist control device configured to perform travel assistance by generating a warning vibration in a steering member when the occurrence of the future or actual departure is determined;
 wherein, defining a time derivative value of a steering angle of the steering member as a steering angular velocity and defining a time derivative value of the steering angular velocity as a steering angular acceleration, when the warning vibration is generated, the travel assist control device notifies a driver concerning an anti-departure direction or a departure direction, by causing the steering angular acceleration in the anti-departure direction in one period of the warning vibration to be greater than the steering angular acceleration in the departure direction.

2. The travel assist device according to claim 1, wherein the travel assist control device, when the warning vibration is generated, sets a target current with respect to a motor configured to cause a change in the steering angle of the steering member, in accordance with a continuous wave based on a rectangular wave, and generates the warning vibration in which a waveform indicative of the steering angular velocity is a sawtooth wave.

3. The travel assist device according to claim 1, wherein the travel assist control device generates the warning vibration independently of any the departure prevention operation by the travel assist device such that the steering angle of the steering member can remain unchanged before and after the warning vibration is generated.

4. The travel assist device according to claim 1, wherein the travel assist control device:
 when the warning vibration is generated, sets a target steering angular velocity, which is a target value of the steering angular velocity;
 forms the target steering angular velocity along a sawtooth shaped reference waveform, together with setting a limit value, an absolute value of the limit value being smaller than that of a peak value of the reference waveform, and sets the target steering angular velocity so as not to exceed the limit value.

5. The travel assist device according to claim 4, wherein the travel assist control device gradually decreases the absolute value of the limit value on basis of a degree of the departure, or the departure direction or the anti-departure direction.

6. The travel assist device according to claim 1 wherein, after the warning vibration has been generated, the travel assist control device applies to the steering member a torque that induces the user's own vehicle to return to the travel path.

7. The travel assist device according to claim 6, wherein the travel assist control device operates a braking device of the user's own vehicle, in a case it continues to be determined that the occurrence of a future or actual departure of the user's own vehicle exists after generation of the warning vibration.

8. A method of controlling a travel assist device having a travel path recognizing unit configured to recognize a travel path of a user's own vehicle, a departure judgment unit configured to determine an occurrence of a future or actual departure of the user's own vehicle with respect to the travel path, and a travel assist control device configured to perform travel assistance by generating a warning vibration in a steering member when the occurrence of the future or actual departure is determined, wherein a time derivative value of a steering angle of the steering member is defined as a steering angular velocity, and a time derivative value of the steering angular velocity is defined as a steering angular acceleration, the method comprising the step, performed by the travel assist control device, of:
 when the warning vibration is generated, notifying a driver concerning an anti-departure direction or a departure direction, by causing the steering angular acceleration in the anti-departure direction in one period of the warning vibration to be greater than the steering angular acceleration in the departure direction,
 wherein the method further comprises the steps, performed by the travel assist control device, of, when the warning vibration is generated:

setting a target current with respect to a motor configured to cause a change in the steering angle of the steering member, in accordance with a continuous wave based on a rectangular wave;

causing the steering angular acceleration in the anti-departure direction to be greater than the steering angular acceleration in the departure direction; and generating the warning vibration in which a waveform indicative of the steering angular velocity is a sawtooth wave.

9. The method of controlling a travel assist device according to claim 8, further comprising the steps, performed by the travel assist control device, of:

when the warning vibration is generated, setting a target steering angular velocity, which is a target value of the steering angular velocity;

forming the target steering angular velocity along a sawtooth shaped reference waveform, together with setting a limit value, an absolute value of the limit value being smaller than that of a peak value of the reference waveform, and setting the target steering angular velocity so as not to exceed the limit value; and gradually decreasing the absolute value of the limit value on basis of a degree of the departure, or the departure direction or the anti-departure direction.

10. The method of controlling a travel assist device according to claim 8, further comprising the steps, performed by the travel assist control device, of, after the warning vibration has been generated:

applying to the steering member a torque that induces the user's own vehicle to return to the travel path; and operating a braking device of the user's own vehicle, in a case it continues to be determined that the occurrence of a future or actual departure of the user's own vehicle exists.

* * * * *